Figure 1:
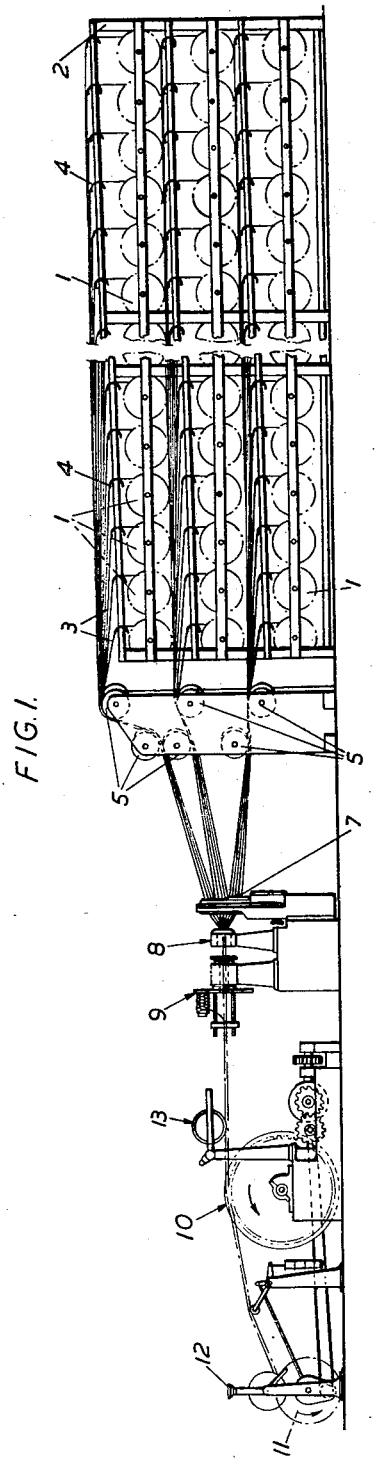

Oct. 23, 1951      J. R. PHEAZEY      2,572,052
METHOD AND MACHINE FOR MAKING ELECTRIC COMMUNICATION CABLES
Filed Dec. 8, 1948      3 Sheets-Sheet 1

INVENTOR.
JOHN RICHARD PHEAZEY
BY
ATTORNEY

Oct. 23, 1951 J. R. PHEAZEY 2,572,052
METHOD AND MACHINE FOR MAKING ELECTRIC COMMUNICATION CABLES
Filed Dec. 8, 1948 3 Sheets-Sheet 2
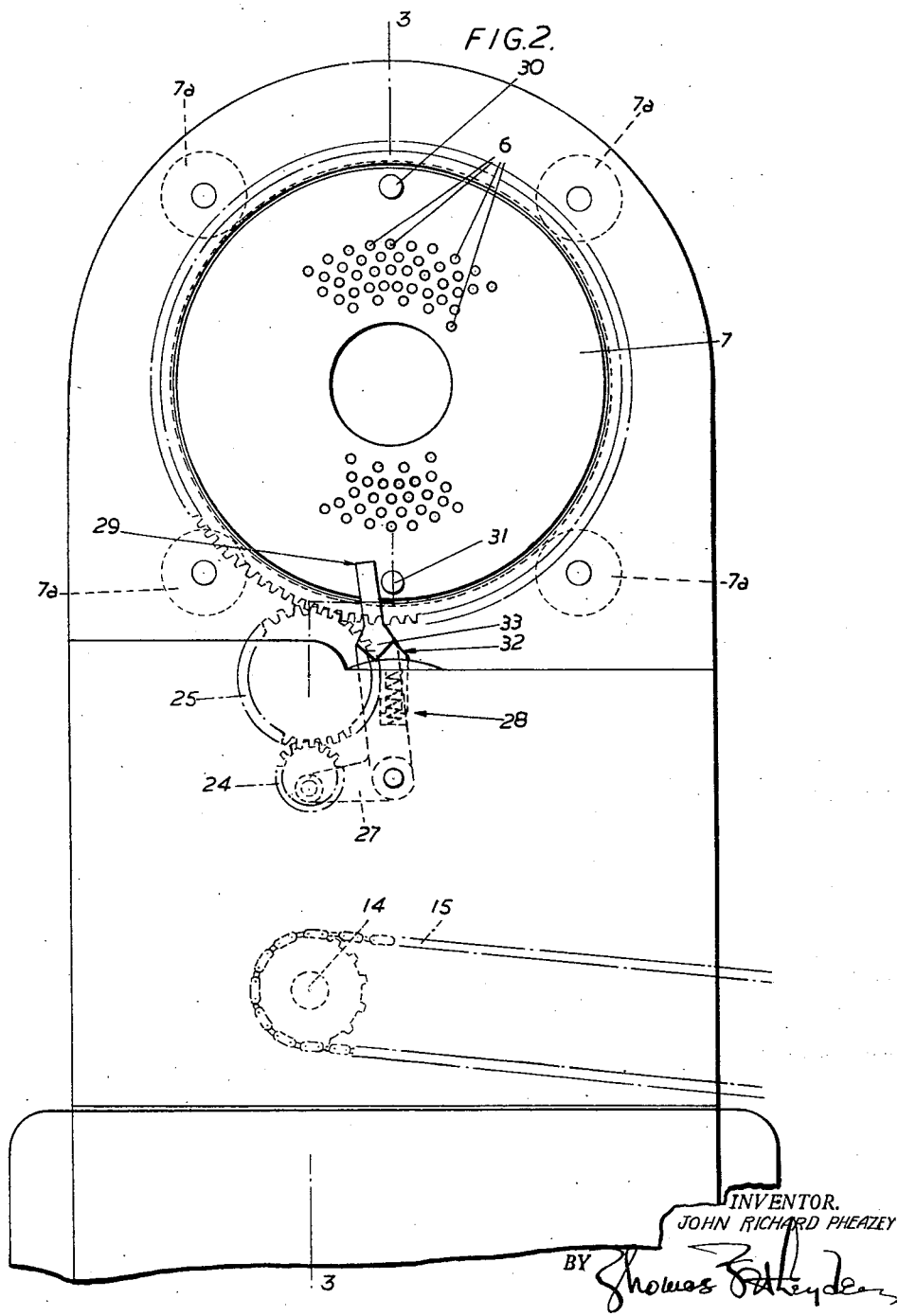
INVENTOR.
JOHN RICHARD PHEAZEY
ATTORNEY Oct. 23, 1951          J. R. PHEAZEY          2,572,052
METHOD AND MACHINE FOR MAKING ELECTRIC COMMUNICATION CABLES
Filed Dec. 8, 1948          3 Sheets-Sheet 3
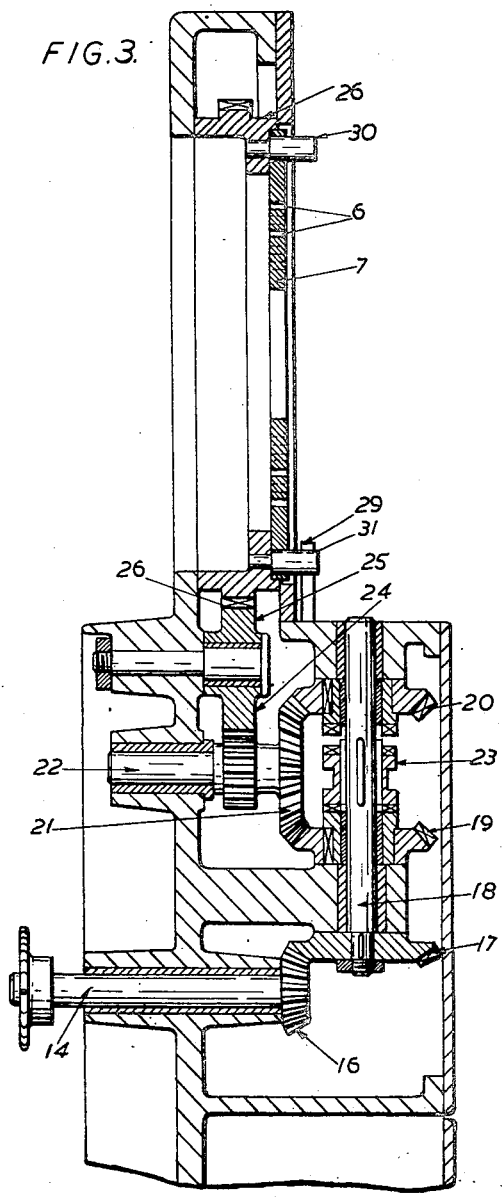

Patented Oct. 23, 1951

2,572,052

UNITED STATES PATENT OFFICE 2,572,052

METHOD AND MACHINE FOR MAKING ELECTRIC COMMUNICATION CABLES

John Richard Pheazey, London, England, assignor to International Standard Electric Corporation, New York, N. Y., a corporation of Delaware Application December 8, 1948, Serial No. 64,213
In Great Britain November 14, 1947

5 Claims. (Cl. 57—3)

This invention relates to electric communication cable. It is the universal practice in making such cables to twist together the various strands from which the cable is made up. In the so-called unit type cable strands consisting of pairs or quads are twisted together to form a large unit consisting of 50 to 100 pairs of quads and the units are then twisted together to form the finished cable.

Any form of twisting involves parts rotating about the longitudinal axis of the machine in which the cable is made. A multi-layer cable or a cable comprising coaxial cores laid up together is usually made by drawing the strands from supply reels mounted upon fliers rotated continuously about the longitudinal axis of the machine and units of a unit type cable may also be made in the same way. Units of a unit type cable have also been made by imparting to the take up capstan, in addition to its take-up rotation about its own axis, a rotation of its axis in a plane normal to the longitudinal axis of the machine. It will be appreciated that either of these methods involves the rotation of heavy parts.

According to the present invention a method of manufacturing an electric cable comprises drawing separate strands from supply reels mounted in a stationary framework, passing said strands through a lay plate reciprocated through an appreciable angle, binding the said strands in the relative positions conferred in them by said lay plate and taking up the resulting bundle by a capstan rotating about its own axis in a fixed framework.

The bundle thus formed may be a complete cable or a unit of a cable.

It will be clear that in the method of manufacture according to the invention the heavy rotating parts of known machines are replaced by a light reciprocating part so that a less expensive machine and lower part are required whilst the speed of manufacture is increased.

In the case of a unit of a unit-type cable a single lay plate only is necessary and a reciprocation of this lay plate through 180° in each direction has been found to be satisfactory from the point of view of cross-talk.

In the case of a layer type cable it is preferable to use a lay plate for each layer the reciprocations of each lay plate being synchronised so as to confer an out of phase looping to the strands in successive layers.

In the case of a cable comprising a plurality of coaxial cores, the twisting in known machines is effected for mechanical considerations of equalising the lengths of each core in a length of cable that is to be wound upon a reel and in view of such considerations it is advisable to rotate the lay plate through a full 360° in each direction.

The invention will be better understood from the following description of a machine for manufacturing a unit of a unit type cable by the method according to the invention, taken in conjunction with the accompanying drawings in which:

Fig. 1 shows the machine in elevation.
Fig. 2 is a view of a detail of the machine, and
Fig. 3 is a section on the line 3—3 of Fig. 2.

Referring to the drawings, reels 1 are rotably mounted in a rack 2. The reels 1 are wound with twisted pairs 3 which are drawn off the reels 1 over guides 4 and guide pulleys 5, and are led through separate holes 6, Figs. 2 and 3 in a lay plate 7. The unit then passes through a die and holder 8 and is drawn past a binding head 9 which applies a binding to hold the pairs in position in the unit. The bound unit passes over a capstan 10 and is taken up on a reel 11 mounted on a take-up stand 12. The capstan 10 and reel 11 are driven in well-known manner from the main shaft (not shown) of the machine. A measuring wheel 13 measures the length of manufactured unit in the usual manner.

The lay plate 7 supported by roller supports 7a and is reciprocated through a desired angle by means shown in Figs. 2 and 3. A lay shaft 14 is driven by means of a chain 15 from the main shaft (not shown). The lay shaft 14 carries a bevel wheel 16 meshing with a bevel wheel 17 fixed to a shaft 18. Freely mounted around shaft 18 are bevel wheels 19, 20 both meshing with a bevel wheel 21 fixed to a shaft 22. Splined to the shaft 18 is a reversing dog 23 which clutches either bevel wheel 19 or bevel wheel 20 to shaft 18, and thus causes shaft 22 to be driven in one or other direction of rotation. A gear wheel 24 drives, through an intermediate gear 25, a geared ring 26, to which is fixed the lay-plate 7.

The reversing dog 23 is moved endways along shaft 18 by means of one arm 27 of a bell-crank trip lever 28, the other arm 29 of which lies in the path of pegs 30, 31 carried on the lay plate 7. The angle through which the lay plate 7 is reciprocated is determined by the angle between the radii upon which pegs 30, 31 lie and the position of these pegs may be made adjustable for the purpose of adjusting this angle. When one of these pegs hits the arm 29 of bell crank lever 28 the dog 23 is moved along the shaft 18 to reverse the drive to the lay plate. When bell crank lever 28 has been moved it is held in position by a spring loaded slide 32 which engages one side or the other of a knife edge projection 33 on the arm 29.

The pegs 30, 31 are shown in the drawing in position 180° apart so that the lay-plate 7 rotates 180° in one direction and then 180° in the other.

If one of the pegs 30, 31 be removed the lay plate 7 will rotate through 360° in one direction and then through 360° in the other.

The modifications required for the manufacture of a layer type cable will be clear to those skilled in the art. Each layer would be formed by a separate lay plate, those lay plates after the first counting from the supply reels being annular for the passage of the layer or layers already formed.

The framework 2 may be duplicated, the two frameworks in such case lying at angles to the longitudinal axis of the machine, in order that the supply reels 1 in one of the frameworks may be loaded thereon whilst strands are being drawn off the reels in the other.

While the principles of the invention have been described above in connection with specific embodiments and particular modifications thereof, it is to be clearly understood that this description is made only by way of example and not as a limitation on the scope of the invention.

Having now particularly described and ascertained the nature of my said invention and in what manner the same is to be performed, I declare that what I claim is:

1. Method of manufacturing an electric communication cable which comprises drawing separate strands from supply reels mounted in a stationary framework, reciprocating said strands through an appreciable angle, and binding the said strands in the relative positions conferred on them by said reciprocation.

2. Method as claimed in claim 1, which comprises reciprocating said strands through an angle of 180° in each direction.

3. Method as claimed in claim 1, which comprises reciprocating said strands through an angle of 360° in each direction.

4. Cable manufacturing machine comprising a plurality of reels carrying strands of wire for a cable, a lay plate having a plurality of openings through which said strand parts pass, means angularly reciprocating said lay plate, and means binding the strands in the relative positions given to them by said lay plate.

5. Cable manufacturing machine according to claim 4 for which the means for reciprocating said lay plate comprises a pair of gears respectively adapted to rotate said lay plate in opposite directions, a drive shaft, clutch means for connecting said drive shaft for one or the other of said gears, a peg projecting from said lay plate, and lever means actuated by said peg for controlling the position of said clutch means.

JOHN RICHARD PHEAZEY.

REFERENCES CITED

The following references are of record in the file of this patent:

UNITED STATES PATENTS

| Number | Name | Date |
|---|---|---|
| 1,988,950 | Knoderer et al | Jan. 22, 1935 |
| 2,412,196 | Ashbaugh et al. | Dec. 10, 1946 |